(12) United States Patent
Hiller et al.

(10) Patent No.: US 10,440,150 B2
(45) Date of Patent: Oct. 8, 2019

(54) DELIVERY PACING SYSTEMS AND METHODS

(71) Applicant: Open Text Holdings, Inc., San Mateo, CA (US)

(72) Inventors: Sherri Renee Hiller, Colts Neck, NJ (US); Samuel N. Kamens, West Orange, NJ (US); Richard D. Shriver, Tinton Falls, NJ (US)

(73) Assignee: Open Text Holdings, Inc., San Mateo, CA (US)

( * ) Notice: Subject to any disclaimer, the term of this patent is extended or adjusted under 35 U.S.C. 154(b) by 389 days.

(21) Appl. No.: 14/329,232

(22) Filed: Jul. 11, 2014

(65) Prior Publication Data

US 2015/0026294 A1      Jan. 22, 2015

Related U.S. Application Data

(60) Provisional application No. 61/847,933, filed on Jul. 18, 2013.

(51) Int. Cl.
*H04L 29/08*      (2006.01)

(52) U.S. Cl.
CPC .................. *H04L 67/327* (2013.01)

(58) Field of Classification Search
CPC ........ H04L 67/327; H04L 29/08; H04L 67/10
USPC .......................................... 709/217
See application file for complete search history.

(56) References Cited

U.S. PATENT DOCUMENTS

| | | | |
|---|---|---|---|
| 5,659,599 A * | 8/1997 | Arumainayagam | ........................ H04M 3/53325 379/245 |
| 6,574,660 B1 * | 6/2003 | Pashupathy | ............. H04L 29/06 707/999.01 |
| 6,963,417 B1 * | 11/2005 | Saito | ................... H04N 1/00214 358/1.15 |
| 7,035,212 B1 * | 4/2006 | Mittal | ...................... H04L 45/60 370/230 |
| 7,500,261 B1 * | 3/2009 | Myers | ..................... H04H 20/33 370/311 |
| 8,656,071 B1 * | 2/2014 | Onufryk | .................. G06F 13/24 710/52 |
| 8,843,563 B1 * | 9/2014 | Hartman | ................. G06Q 10/06 709/206 |

(Continued)

*Primary Examiner* — Nicholas R Taylor
*Assistant Examiner* — Meng Vang
(74) *Attorney, Agent, or Firm* — Sprinkle IP Law Group

(57) ABSTRACT

Embodiments provide a delivery pacing solution to keep customers from affecting other customers. The delivery pacing solution need not be predefined or pre-configured for any customer or any particular job or job type and can be implemented in various ways, for instance, in a queue manager or a dynamic ticketing server. In some embodiments, an agent may obtain from a queue an item specifying a destination and determine whether the item has a concurrency parameter for a group associated with the destination. If so, the agent delivers the item to the destination. If not, the agent dynamically determines a concurrency parameter and returns the item to the queue with the concurrency parameter which controls a maximum number of items in the group that can be concurrently processed for delivery to the destination. A queue manager applies a concurrency rule to the item based on the concurrency parameter.

16 Claims, 9 Drawing Sheets

(56) References Cited

U.S. PATENT DOCUMENTS

| | | | |
|---|---|---|---|
| 2003/0182464 A1* | 9/2003 | Hamilton | G06F 9/546 |
| | | | 719/314 |
| 2003/0236745 A1* | 12/2003 | Hartsell | G06Q 20/102 |
| | | | 705/40 |
| 2012/0066313 A1* | 3/2012 | Ban | G06F 9/546 |
| | | | 709/206 |
| 2014/0280819 A1* | 9/2014 | Gupta | G06F 9/5083 |
| | | | 709/223 |

* cited by examiner

DELIVERY PACING SYSTEMS AND METHODS

CROSS-REFERENCE TO RELATED APPLICATION(S)

This is a conversion of, and claims a benefit of priority under 35 U.S.C. § 119 from U.S. Provisional Application No. 61/847,933, filed Jul. 18, 2013, entitled "DELIVERY PACING SYSTEM AND METHOD," which is incorporated by reference as if set forth herein in its entirety, including the appendices.

TECHNICAL FIELD

This disclosure relates generally to information delivery. More particularly, embodiments disclosed herein relate to new systems, methods, and computer program products for delivery pacing.

BACKGROUND

In the context of push deliveries such as cloud fax services, a system may comprise one or more server machines connected to a number of lines for servicing requests to send and receive faxes. The number of lines may be predetermined or fixed. One issue the system may need to address is volume. When a client has many requests that need to be serviced, deliveries to other clients connected to the system may be adversely affected—for instance, faxes to other clients may be slowed downed to an unacceptable speed.

Another issue is that a client (e.g., customer A) may be slow in receiving a delivery or deliveries. This can be caused by various reasons. For example, a server on the customer A side that is supposed to be receiving the deliveries may be experiencing a problem such as a technical difficulty and therefore is receiving the deliveries slowly. Suppose the system has X number of "lines" or resources available and a limited of number of processes to handle jobs for all client machines connected thereto. If there are X number of jobs outstanding for customer A and it takes Y amount of time to process each job because customer A is receiving slowly, then for X amount of time the system would be completely booked up and everything else builds up behind it.

A skilled artisan may recognize that there can be various ways to address the issues mentioned above. For example, a resource allocation based solution may try to limit the time and/or number of jobs (incoming or outgoing) that a customer can request at any given time, given the system's resources and the number of customers connected to the system. A rule based solution may attempt to prioritize deliveries based on some customer-specific and/or job-type prioritization rules. A performance based solution may involve monitoring and detecting whether a customer is receiving slowly and taking reactive action to try to speed up a delivery or deliveries to that particular customer (e.g., by dedicating all resources to the slow customer).

These solutions have their shortcomings and drawbacks. For example, they may require reconfiguration when a new customer is added to the system and/or place unnecessarily limit(s) on the system and/or the customer(s). Consequently, there is room for innovations and improvements.

SUMMARY OF THE DISCLOSURE

Embodiments of a delivery pacing system, method, and computer program product disclosed herein can address the aforementioned issues and more. Since a goal of this disclosure is to provide information delivery services to customers with one or more client machines connected to the delivery pacing system, the terms "customer" and "client" may be used interchangeably hereinafter.

As discussed above, a server machine can be connected to a predetermined number of lines for servicing different destinations, perhaps belonging to different customers. An object of the invention is to keep customers from affecting other customers. As described below, these and other objects of the invention can be realized by way of a delivery pacing solution that does not need to be predefined or pre-configured for any customer or any particular job or job type. The delivery pacing solution disclosed herein can be implemented in various ways, for instance, in a queue manager.

In some embodiments, a delivery pacing method may comprise obtaining, by an agent from a queue, an item specifying a destination and determining whether the item has a concurrency parameter for a group associated with the destination. If the item has a concurrency parameter for a group associated with the destination, the agent delivers the item to the destination. Otherwise, the agent dynamically determines a concurrency parameter for the item and returns the item to the queue with the concurrency parameter. In some embodiments, an item can be a document, fax, file, message, or piece of information.

In some embodiments, a concurrency parameter for a group controls a maximum number of items in the group that can be concurrently processed by a server machine for delivery to a destination. In some embodiments, the agent can be one of a plurality of background processes running on the server machine. In some embodiments, a group can be one of a plurality of destination groups associated with different destinations. The concurrency parameter of each destination group of the plurality of destination groups controls a maximum number of items in each destination group that can be concurrently processed for delivery to a respective destination. A queue manager applies a concurrency rule to an item in the queue that it manages based on a concurrency parameter associated with the item. In some embodiments, the queue manager applies the concurrency rule to the item independently of a priority value associated with the item.

In some embodiments, the delivery pacing method is performed when a concurrency setting in a delivery system is enabled. If concurrency is not enabled, an item may be delivered to a destination without processing its concurrency parameter.

One embodiment comprises a system comprising a processor and a non-transitory computer-readable storage medium that stores computer instructions translatable by the processor to perform a delivery pacing method substantially as described herein. Another embodiment comprises a computer program product having a non-transitory computer-readable storage medium that stores computer instructions translatable by a processor to perform a delivery pacing method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein are directed to a system configured for providing information (e.g., faxes, files, documents, or the like) delivery services to a plurality of clients. The system may implement a pacing algorithm that can keep customers from affecting other customers. The pacing algorithm does not have to be predefined or pre-configured for any customer or any particular job or job type. The pacing algorithm can be implemented in various ways. For the purpose of illustration and not of limitation, this disclosure describes two example implementations in detail, one involving a queue manager and another involving a dynamic ticketing server.

Figure 1:
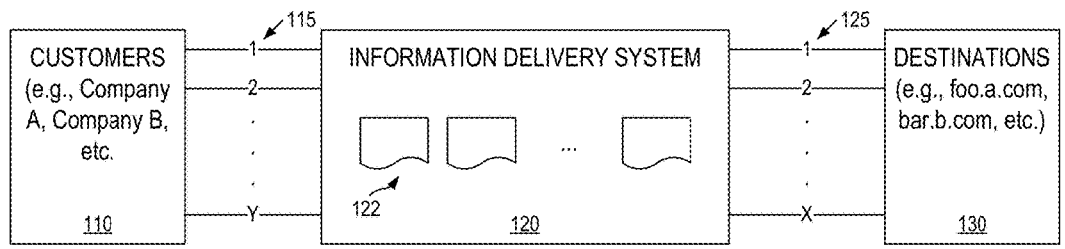
FIG. 1 depicts a diagrammatic representation of an exemplary environment in which an information delivery system may be implemented. In this example, concurrency is not enabled.

FIG. 1 depicts a diagrammatic representation of exemplary computing environment 100 in which embodiments of delivery pacing systems may be implemented and, in particular, one in which concurrency is not enabled. As shown, information delivery system 120 is communicatively coupled via a plurality of communication links 115 to one of more customers 110, e.g., Company A, Company B, etc. Information delivery system 120 may be implemented as one or more server machines. The information delivery system is likewise communicatively coupled via another plurality of communication links 125 to deliver items of information 122 to one or more destinations 130.

Figure 2:
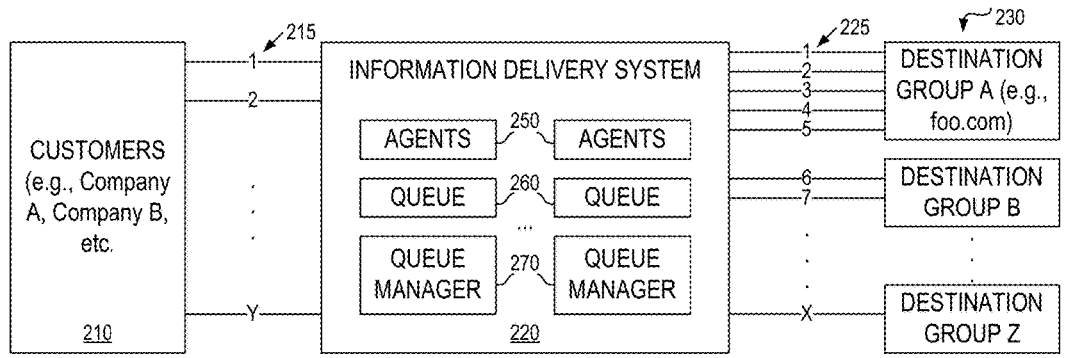
FIG. 2 depicts a diagrammatic representation of an example of an information delivery system having a queue manager according to one embodiment. In this example, concurrency is enabled.

FIG. 2 depicts a diagrammatic representation of exemplary computing environment 200 in which embodiments of delivery pacing systems may be implemented and, in particular, one in which concurrency is enabled in a queue manager implementation. In this example, information delivery system 220 is communicatively coupled via a plurality of communication links 215 to a plurality of customers 210, e.g., Company A, Company B, etc. Information delivery system 220 is also coupled via a plurality of communication links 225 to a plurality of destination groups 230 (e.g., Destination Group A, Destination Group B, . . . , Destination Group Z). In this case, information delivery system 220 includes a plurality of software delivery agents 250. In some embodiments, agents 250 are associated with queues 260 and queue managers 270, as will be discussed in greater detail below.

Figure 3:
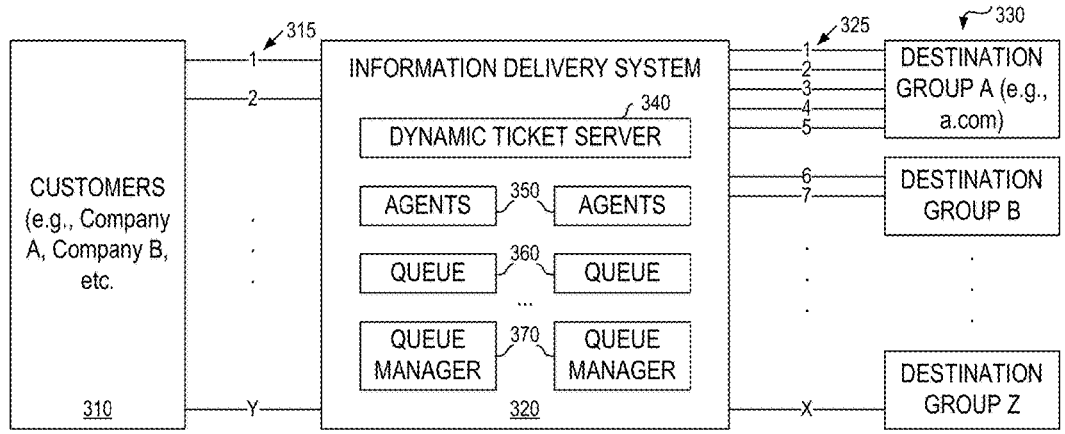
FIG. 3 depicts a diagrammatic representation of an example of an information delivery system having ticketing server according to one embodiment. In this example, concurrency is enabled.

FIG. 3 depicts a diagrammatic representation of exemplary computing environment 300 in which embodiments of delivery pacing systems may be implemented and, in particular, one in which concurrency is enabled in a dynamic ticketing server implementation. In this example, information delivery system 320 is communicatively coupled via a plurality of communication links 315 to a plurality of customers 315, e.g., Company A, Company B, etc. Information delivery system 320 is also coupled via a plurality of communication links 325 to a plurality of destination groups 230 (e.g., Destination Group A, Destination Group B, . . . , Destination Group Z). In this case, information delivery system 320 includes dynamic ticket server 340 and a plurality of software delivery agents 350. The agents are associated with queues 360 and queue managers 370, as will be discussed in greater detail below.

In some embodiments, agents 350 may be implemented as delivery software agents, including web services delivery agent (WSDA) and ftp push delivery agent (FPDA). A WSDA sends documents via web service calls and a FPDA sends documents via file transfer protocol (FTP). Web services and FTP are known to those skilled in the art and thus are not further described herein. The agents may be implemented as background processes.

Figure 4:
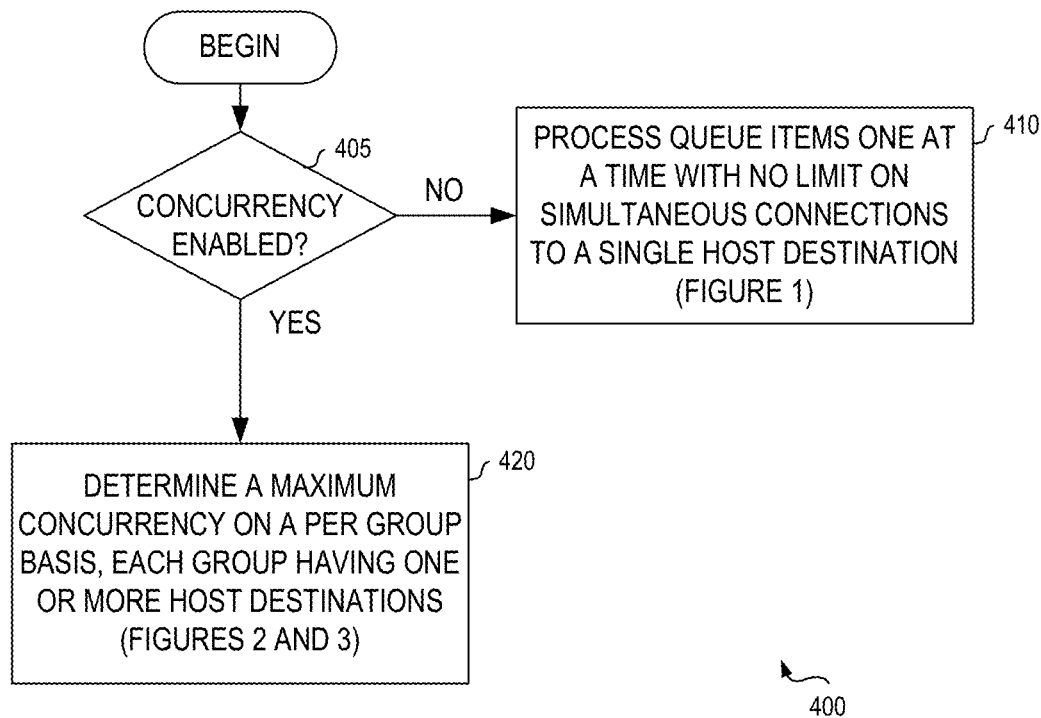
FIG. 4 depicts a flow diagram illustrating an example of a control mechanism for processing queue items according to one embodiment.

FIG. 4 depicts a flow diagram illustrating an example of control mechanism 400 for processing queue items. In operation, as shown in FIG. 4, a system may determine if concurrency is enabled (step 405). If not, then queue items will be processed one at a time with no limit on simultaneous connections to a single host destination (step 410). Otherwise, however, concurrency functions such as those in FIGS. 2 and 3 will be implemented (step 420). In particular, a maximum concurrency will be determined on a per group basis, each group having one or more host destinations.

Before describing example implementations in detail, it may be helpful to discuss what a queue item entails, its relationships with its owner and its client, and the various states that it may be in while it is being processed.

In this disclosure, the term "queue item" refers to an item in a queue. A queue item may have a data structure is the basic object being manipulated by the underlying queue management system. In some embodiments, a queue item data structure may comprise several types of data:

Data elements which provide data required by the queue manager, for instance:

Data elements which are somewhat specific to a particular computing environment such as the Cross Domain Discovery Service (XDDS) environment. XDDS is known to those skilled in the art and thus is not further described herein.

A variable keyword/value pair area which may be used to pass other application specific data.

An example of a detailed description of structure data members can be found in Table 1 below.

TABLE 1

| Data Item Name | Description |
| --- | --- |
| service_class | The XDDS service class of the item, this is a prioritization field. In one embodiment, the lower the value, the higher the priority. The exact values are not checked by the server; however, there are the following predefined values (in priority order): QM_CLASS_OPER for operator requested (high priority) functions. QM_CLASS_EXPRESS_BCAST for normal express broadcast jobs. QM_CLASS_EXPRESS_P2P for normal express point to point jobs. QM_CLASS_OFFPEAK_BCAST for normal offpeak broadcast jobs. QM_CLASS_OFFPEAK_P2P for normal offpeak point to point jobs. This is not an exhaustive list of the possible values. Others may also be defined and maybe even given #define macros. In some XDDS systems, items can be set with a fixed value and the prioritization of queue items can be set by the priority field (see below). The QM_CLASS_OPER is used to ensure that these items are at a higher priority than typical items on a queue. |
| priority | Within a service class, the priority of an item is determined by this field. In one embodiment, the lower the number, the higher the priority. The combination of class and priority can determine where an item is placed on a queue. |
| qid | This is the principle identifier of the item and is assigned by the queue manager. |
| qstatus | This field reflects the status of the item from the queue manager viewpoint. |
| astatus | This field reflects the status of the item set by a client application when the item is completed. The queue manager does not use this field and just copies it around. By convention, 0 indicates no error. |
| update_cnt | This field is used by the queue manager to validate that a requeue operation is being performed with the latest copy of the item. If a requeue is attempted, and the queue item has been modified since the copy being requeued, the requeue operation is denied with a QMERR_STALE_ITEM error. Applications should not attempt to modify this field directly and should get a fresh copy of the item prior to modification and requeue. |
| hdrno | This field is not used by the queue manager. It is provided for use by applications. |
| docno | This field is not used by the queue manager. It is provided for use by applications. |
| jobno | This field is not used by the queue manager. It is provided for use by applications. If used, it should contain a job number. |
| subjobno | This field is not used by the queue manager. It is provided for use by applications. If used, it should contain a sub-job number. |
| seekpos | This is used internally by the queue manager. Applications should not attempt to modify it (however, modification is harmless). |
| qtime | This is to track the time that the item was first placed on the queue. |
| queue | The name of the queue upon which this item resides. In one embodiment, this string is limited to 31 bytes in length. This is a 32 character array and includes a terminating '\0' character. |
| owner | The queue manager client name of the owner of this item. The owner is usually either the entity which created the item, or the one which is doing the completion side processing for the item, depending on the qstatus of the item. |
| client | The queue manager client name of the client of this item. The client is usually the entity which processed the item. |

TABLE 1-continued

| Data Item Name | Description |
| --- | --- |
| keys | A linked list of keyword/value pairs associated with the item. This provides the variable portion of a queue item. Functions are provided to access/modify the keyword/value pairs. |
| mtime | The last modification time of the queue item. This is maintained by the queue manager. |
| alarm | If the item is in the pending state, there can be two possible meanings, depending on the setting of the auto_pend queue manager option for this queue. The default for the auto_pend feature is OFF.<br>1. auto_pend OFF (default): The number of seconds during which an item may remain unmodified without going into the alarmed state. A value of 0 disables the alarm feature.<br>2. auto_pend ON: The number of seconds during which an item may remain in the hold qstatus un-modified without going into the pending state. This allows for retries by placing held items back into the pending state at a pre-determined time.<br>If the item is in the complete state, there can be two possible meanings, depending on the setting of the auto_complete queue manager option for this queue. The default for the auto_complete feature is ON.<br>1. auto_complete OFF: The number of seconds during which an item may remain un-modified without going into the alarmed state. A value of 0 disables the alarm feature.<br>2. auto_complete ON (default): The number of seconds during which an item may remain in the complete_hold qstatus un-modified without going into the complete state. This allows for retries by placing held items back into the complete state at a pre-determined time.<br>If the item is in any other state, all states other than hold and complete_hold are treated as follows: The number of seconds during which an item may remain un-modified without going into the alarmed state. A value of 0 disables the alarm feature.<br>A value of 0 disables the alarm feature. |

Figure 5:
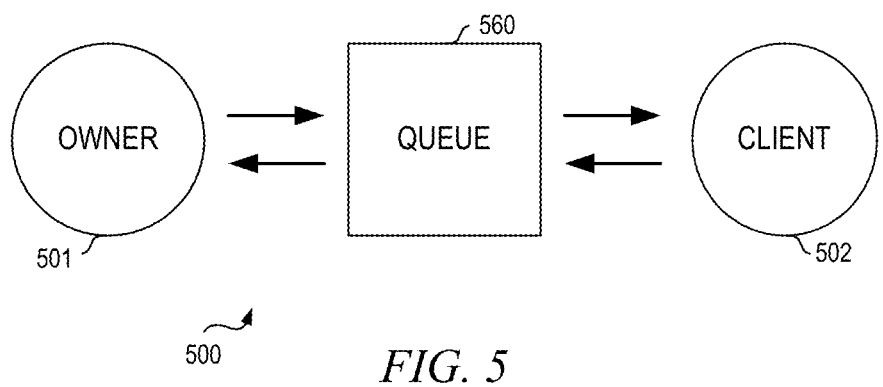
FIG. 5 depicts a diagrammatic representation of a queue item and relationships between its owner and its client according to one embodiment.

FIG. 5 depicts a diagrammatic representation of an example queue item 560 and example relationships 500 between its owner 501 and its client 502 according to one embodiment. A queue manager can be viewed as a communication link between two or more processes (e.g., via a queue manager application programming interface (API)).

Figure 6A:
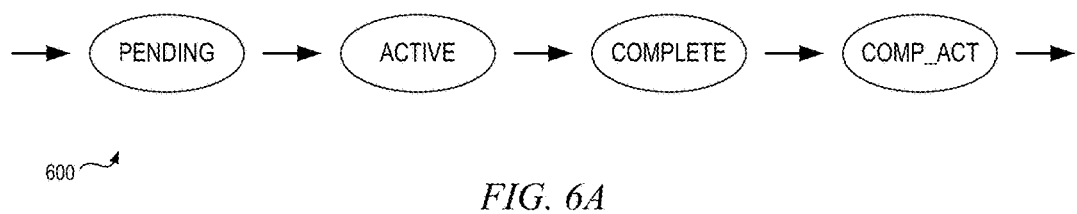
FIG. 6A depicts a state diagram illustrating a normal flow for processing a queue item according to one embodiment.

For any given queue item, there are two programs—an owner and a client. The owner of a queue item is the application which caused the queue item to be placed on the queue. Referring to FIG. 6A, which depicts a state diagram illustrating normal queue item flow 600 for processing a queue item (e.g., queue item 560 shown in FIG. 5), the application which caused the queue item to go into the "pending" state is referred to as the owner (e.g., owner 501 shown in FIG. 5) of the queue item. The owner is expected to reclaim the queue item as it is completed. However, the same process is not required to reap the completed queue item. The client of the queue item (e.g., client 502 shown in FIG. 5) is the application which caused the queue item to go into the "active" state (or the "hold" state, see FIG. 6B). The client is expected to dequeue the queue item from the "pending" state, process them, and finally complete the queue item. Table 2 below shows the normally expected flow of an item in a queue, according to one embodiment.

TABLE 2

| Owner | Client |
| --- | --- |
| {owner prepares request using qm_init_item( ) or qm_copy_item( ) and changing the details of the item} qm_queue( ) | |
| | qm_dequeue(QMS_QSTATUS_PENDING) {Client Processes the request} qm_complete( ) |
| {possibly different owner process} qm_dequeue(QMS_QSTATUS_COMPLETE) {owner does any cleanup processing} qm_destroy( ) | |

Figure 6B:
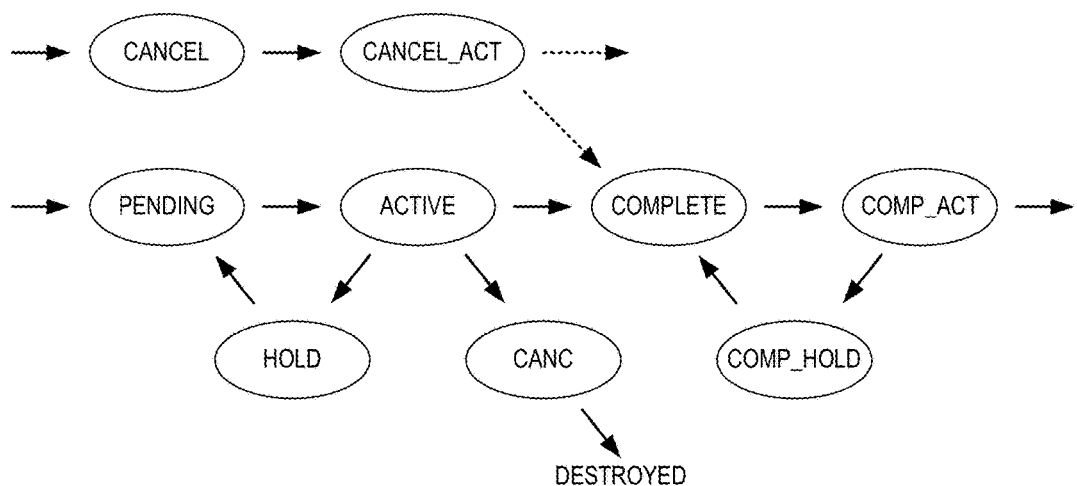
FIG. 6B depicts a state diagram illustrating a complex flow for processing a queue item according to one embodiment.

Those skilled in the art will appreciate that processing of queue items can be implemented in various ways. FIG. 6B depicts a state diagram illustrating complex queue item flow 605 for processing a queue item according to one embodiment.

Some embodiments of a queue manager supports an event notification mechanism where a client can inform the server implementing the queue manager that they are waiting for items and the server will then notify the client when a queue item enters the appropriate state to satisfy the event. This feature can limit the number of polled requests that the queue manager must service.

A variety of conditions are event-able. In some embodiments, the most commonly used ones deal with notification of arrival of queue items into a particular state. These are shown in Table 3 below.

TABLE 3

| Operation #define | Notes |
| --- | --- |
| QM_OP_GET_PENDING | This event allows the client to be notified of items arriving on the queue into the pending state. As with qm_dequeue( ), only items on the exact sub-queue are considered eligible. This is generally used by client programs. |
| QM_OP_GET_COMPLETE | The client is notified when items enter the complete state. This is generally used by owner programs. |
| QM_OP_GET_COMPLETE_OWNER | This is similar to the QM_OP_GET_COMPLETE; however, the owner field of the queue item is checked to see if it matches the supplied argument owner field. |
| QM_OP_GET_CANCEL | The client is notified of items arriving into the QMS_QSTATUS_CANCEL state. |
| QM_OP_STATUS_CHG | The client is notified of modifications to the queue. The minimum time period between events can be controlled by configuration of the queue. |
| QM_OP_GOING_DOWN | The client is notified when the queue manager has entered a quiesced (temporarily inactive or inhibited) state. This may be used internally to the client code to modify certain behavior. This feature can increase the rate of re-registration attempts, to enable quicker re-syncing to the next instance of the queue manager. |

Some embodiments of a queue manager can support an active cancellation mechanism. In some embodiments, this can be done via an API function that allows notification of cancellation of a queue item to be sent to a waiting client application. The effect on the specified queue item may depend on the status of the original queue item, as illustrated in Table 4 below.

TABLE 4

| Queue Item State | Description |
| --- | --- |
| Pending | If the queue item is in the pending state, a qm_cancel_item( ) call will remove the item from the queue, and return an indication that this was the outcome. |
| Active | If the queue item is in the active state, a qm_cancel_item( ) call will cause a new queue item to be created and placed into the CANCEL_PENDING state. From here, either qm_dequeue( ) or event driven mechanisms will allow the item to be retrieved immediately (to the CANCEL_ACTIVE state), using new event and state definitions. In essence, this creates a new set of states into which a queue item may reside, e.g., CANCEL_PENDING and CANCEL_ACTIVE. These are similar to the PENDING/ACTIVE and COMPLETE/COMPLETE_ACTIVE state pairs. The next state may be destroyed, or complete, depending on the nature of the applications. |
| Complete | No action will be taken. |
| Complete Active | No action will be taken. |
| Destroyed | An error will be returned. |
| Hold | The item will be treated as if it were in the PENDING state. |
| Complete Hold | The item will be treated as if it were in the COMPLETE state. |

There are cases where the number of items that are allowed to be dequeued into the active state (e.g., the "QMS_QSTATUS_ACTIVE" state) at any one time should be limited. This limitation can be controlled at the server side via a concurrency limiting feature where a queue manager keeps track of how many items are outstanding in the active state to limit the number of resources used for a particular function. In some embodiments, this tracking is implemented by a queue manager keeping track of the number of queue items outstanding that contain identical (perhaps case insensitive) values in a pre-configure keyword.

In some embodiments, this feature can be turned on for a queue by including the concurrency option in a queue_options definition file for the queue. The value of the option can be the name of a keyword in a queue item is to be used to track concurrency. An example queue config would look like:

jmon: bs=8000 sync=no concurrency=group

This tells the queue manager to enable concurrency tracking and that the keyword to be used is called "group". Any keyword may be used; however, it must not conflict with keywords used for other purposes. For example, domain may not likely be a good choice as the system may expand to use that as a more general keyword.

The limit of concurrently active items is not identified via the queue configuration. The limit is much more dynamic and is allowed to be specified on a per concurrency keyword (in this example, "group") basis. Any item containing the keyword "group" is inspected to see if it also contains a keyword that is the same as the concurrency keyword (e.g., "group") with the string "_limit" appended to it. If so, the limit for that specific value of the concurrency keyword is set to the value of the "_limit" keyword. If the "_limit" keyword does not exist in the queue item, it will default to 5. This default limit is configurable and may vary from implementation to implementation. As a specific example, if the concurrency keyword is "group" and a queue item contains the following:

group: xpedite.com
group_limit: 10

In this example, the effect is that any attempt to dequeue (e.g., qm_dequeue(QMS_QSTATUS_PENDING)) will not return a queue item if the number of outstanding items for the group "xpedite.com" is already 10 or more. Items for other groups that have not yet reached their limit will/may be returned. Effectively, the queue manager ignores items in the pending state (e.g., the "QMS_QSTATUS_PENDING" state) if the group has reached its limit during attempts to dequeue items from the queue.

Here, it is the queue items themselves that specify the concurrency limit. If many items are on the queue for a given group, and they have different "_limit" values, the limit is set by the newest queue item to be put into the pending state on the queue for the given group. More specifically, the limit value is tracked in the queue manager on a "per queue, per group" basis. It is only updated when items go into the pending state (e.g., the "QMS_QSTATUS_PENDING" state, either by qm_queue( )or later by qm_requeue( )). This means that the limit for any given group is set by the newest queue item to be put into the pending state on the queue for that group. This allows the value for the concurrency limit to change and the new value will apply to all existing queue items (even if they have a different "_limit" value). This way, the last item that moved into the pending state will determine the limit for all queue items on the queue for the associated group.

In some embodiments, the concurrency limit can apply to all items on a queue (and all sub-queues). In some embodiments, this is tracked at the queue level. Thus, no matter which sub-queue the items are on, items will be subject to the limit based on all items on the queue.

In some embodiments, any items on the queue in the pending state that do not contain the concurrency keyword (e.g., "group" in the above example) will be allowed to be dequeued without limit. More specifically, a client may dequeue an item, determine that the concurrency limit values have not been set, add the appropriate values, and requeue back in the pending state so the concurrency limitation feature will apply to the item.

In some embodiments, it is also possible to have the entity creating the queue items to set the concurrency limit values so they would not need to be changed. This implementation can be more efficient, although the control of the concurrency feature is at another component of the system (for instance, jmon, see the example queue config discussed above).

In some cases, it may be necessary to disable the concurrency feature in a running system. To this end, a concurrency turnoff mechanism has been created to allow the concurrency feature to be turned off while the queue manager is running. The queue manager keeps the required data to implement the concurrency feature only as items are queued/dequeued and only when the concurrency feature is turned on. Once the concurrency feature has been turned off, one way to get it turned back on again is to bounce the queue manager. This is not persisted—if the concurrency feature should not be turned back on when the queue manager is bounced, the queue manager configuration needs to be changed to remove the concurrency feature.

In some embodiments, a concurrency turnoff mechanism may be implemented as follows. If an item is enqueued to a queue, in the pending state, with a predetermined keyword (e.g., "turn_off_concurrency"), the concurrency feature will be turned off and no further limitation will take place. In this case, the value associated with the keyword is not used, it is the existence of the keyword that matters. As an example, a sequence required in a queue manager control function (e.g., "qmctl") to accomplish this can be:

```
queue <queuename>
oper <operator>
new
set key turn_off_concurrency yes
set qstatus pend
enqueue
```

From a qmctl viewpoint, it will show that an item was queued (but it really wasn't) and then report that it could not get a copy of it after it was created:

```
item was queued
could not re-get queued item, [qerrno 9: Qid not found on queue
[jmon]]
Usage: enq[ueue] [ <queue_name> ]
```

When an item is dequeued from a queue, the queue manager dequeue logic walks the prioritized collection looking for the first item that matches the criteria (e.g., owner, matching, etc . . . ). It is possible for this to force the queue manager to walk many items prior to finding one that can be dequeued, causing a performance issue.

To minimize this effect for the concurrency feature, the queue manager can keep track of the highest priority queue item for each concurrency keyword (e.g., "group"). When the dequeue logic finds an item that is not eligible due to its group having hit the limit of items allowed, it will can skip all items in that group and locate the next highest priority item that is not part of that group. This means that the queue manager will only visit one queue item per concurrency keyword (per "group" in this example). This allows it to skip many high priority items looking for a group that is available to be dequeued.

Note that each time an item is actually dequeued, the dequeue logic walks the list looking for the next highest priority item in that group (so as to keep track of it). Since this ordered search starts at the queue item that is being dequeued, a very small set of items is expected to be inspected.

This efficiency optimization can allow the queue manager to continue to provide high performance even when a small number of concurrency values (e.g., "group") are not keeping up with delivery (for instance, due to resource constraints of any form). A large number of high priority items queued for a single concurrency value will not interfere with performance to any large degree. At most, the queue manger will inspect one item per distinct concurrency keyword value.

Non-limiting, example implementations will now be described in detail with reference to FIGS. 7-12.

Figure 7:
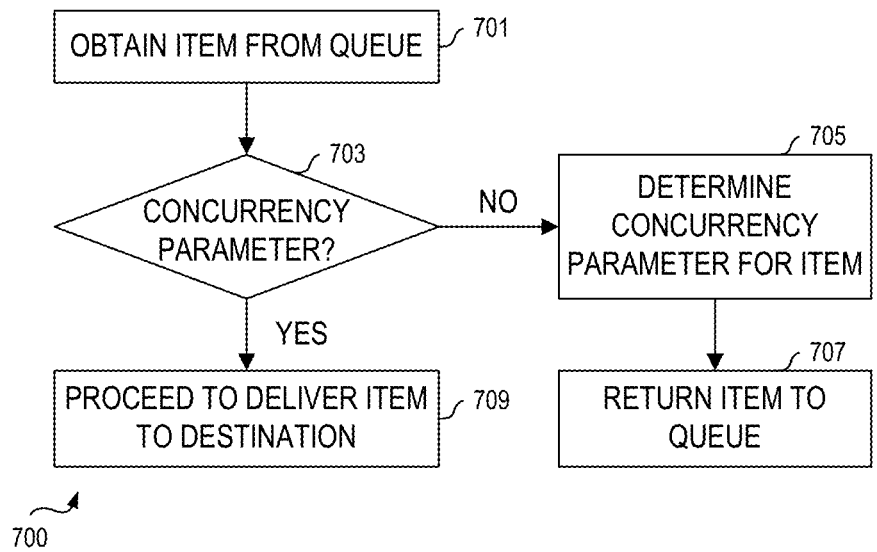
FIG. 7 depicts a flow diagram illustrating an example of a process flow for a delivery agent with concurrency enabled according to one embodiment.

FIG. 7 depicts a flow diagram illustrating an example of process flow 700 for a delivery agent of an information delivery system with concurrency enabled in a queue manager implementation (see FIG. 2). An agent will obtain or receive a queue item from a queue (step 701). In some embodiments, the queue item specifies a destination. The agent then may determine whether the queue item has a concurrency parameter for a group associated with the destination (step 703). If the queue item has a concurrency parameter for the group, the agent will deliver the queue item to the destination (step 709). Otherwise, if the agent does not have a concurrency parameter for the group, the agent will dynamically determine a concurrency parameter for the queue item (step 705) and return the queue item to the queue with the concurrency parameter (step 707). A queue manager will then apply a concurrency rule to the queue item based on the concurrency parameter.

Figure 8:
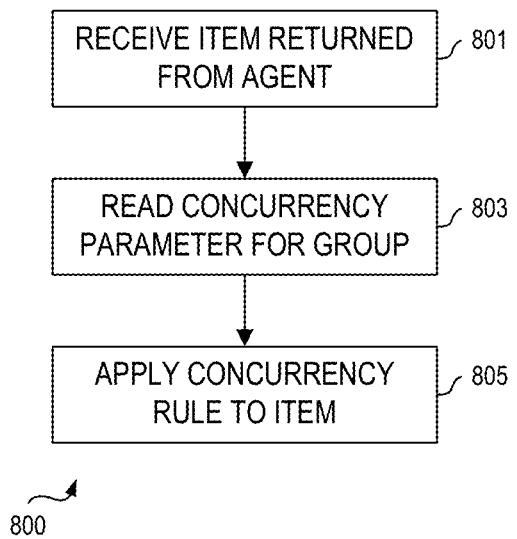
FIG. 8 depicts a flow diagram illustrating an example of a queue manager's response according to one embodiment.

FIG. 8 depicts a flow diagram illustrating an example of a queue manager's response 800. In this case, a queue manager receives a queue item returned from an agent (step 801) and reads the queue item's concurrency parameter for the group (step 803). The queue manager will then apply the concurrency rule to the queue item (step 805), as further exemplified below with reference to FIGS. 9-10.

Figure 9:
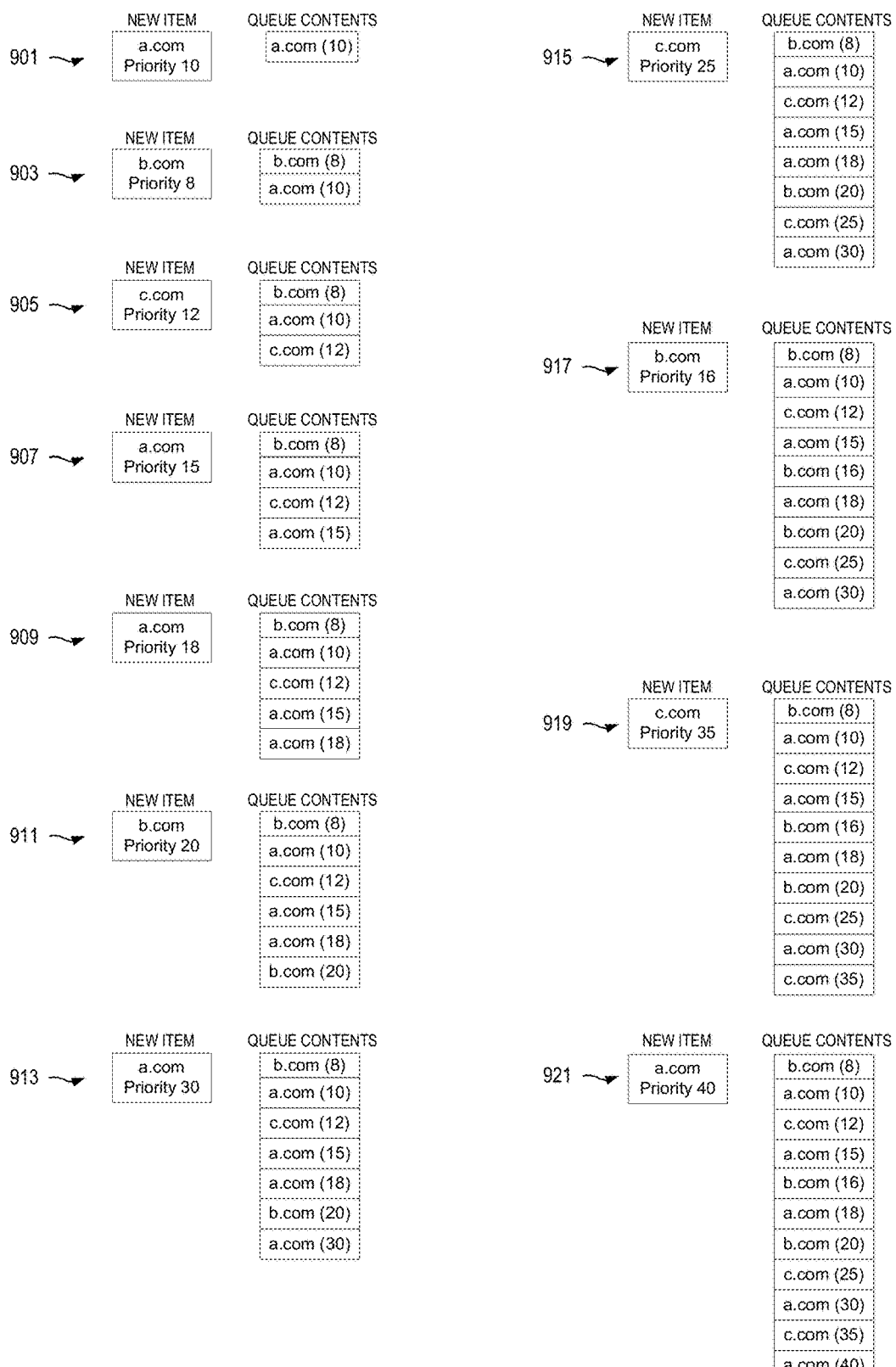
FIG. 9 depicts a diagrammatic representation of an example of a queue set up according to one embodiment in which a queue is populated with items to be delivered.

FIG. 9 depicts a diagrammatic representation of an example of a queue set up in which a queue is populated with items to be delivered by an information delivery system. It illustrates new items being added to the queue and what happens when a new item comes in that has a higher priority than an existing item. In some embodiments, priority does not change delivery pacing. If a queue item cannot be delivered, it is placed back in the queue in accordance with the same priority order.

For example, if a new item for a.com arrive and has a priority of 10, it will be added to the queue (step 901, shown at queue contents). A next new item for b.com with a priority of 8 is added to the queue ahead of the item for a.com, since it has higher priority (step 903). A next item for c.com having a priority of 12 is then added below the items for a.com and b.com (step 905), and so forth (steps 907, 909, 911, 913, 915, 917, 919, and 921). Items having a level of priority intermediate to those of items in the queue will be inserted in order of priority. For example, at step 917, the item for b.com with priority of 16 will be inserted into the queue between the item for a.com with priority of 15 and the item for a.com with priority of 18.

Figure 10:
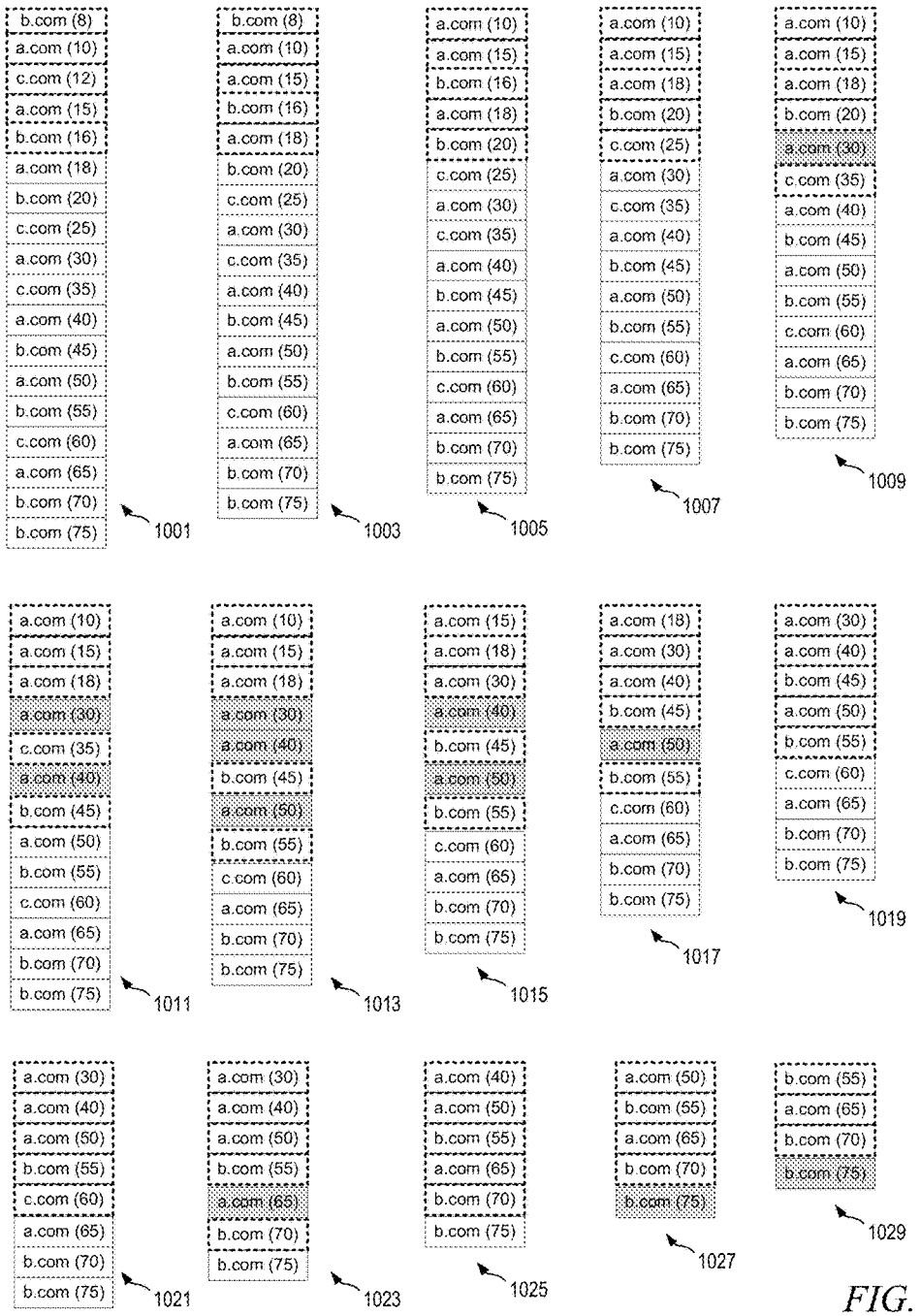
FIG. 10 depicts a diagrammatic representation of an example of queue processing for concurrency according to one embodiment.

FIG. 10 depicts a diagrammatic representation of an example of queue processing for concurrency in an example of an information delivery system. Specifically, it shows the sequence of queue item processing that occurs when a set of delivery agents processes the items in the queue with concurrency rules in place. The diagram shows which items are being processed by agents at any given point in the flow, and notes which items are delayed because of concurrency limits.

In the example illustrated in FIG. 10, the information delivery system has a default concurrency of 2, although destination a.com has a predefined concurrency of 3. In the example illustrated, there are five agents. The dashed lines indicate items currently being processed by an agent. In this example, therefore, there can be a maximum of five items with dashed lines at any given time. The shaded items are those which cannot be processed due to the concurrency limit.

As illustrated in FIG. 10, initially, the agents are processing items b.com (8), a.com (10), c.com (12), a.com (15), and b.com (16) (step 1001). If c.com (12) is processed out, then a.com (18) will move up in the queue to be processed (step 1003). When b.com (8) is processed, b.com (20) moves up in the queue (step 1005). When b.com (16) is processed, c.com (25) moves up in the queue (step 1007). The items have been able to be processed because the concurrency levels for the corresponding destinations have not been exceeded (i.e., only two or fewer than two items for b.com and c.com and only three or fewer than three items for a.com have been present at the top of the queue). With the processing of c.com (25), a.com (30) should move up and be processed. However, since three items are already being concurrently processed, item a.com (30) cannot be processed and so item c.com (35) will be processed in its place (step 1009). When b.com (20) is processed out, the next item in line is a.com (40). However, since there are still three a.com items, item a.com (40) cannot be processed, and so item b.com (45) gets processed instead (step 1011).

When item c.com (35) gets processed out item a.com (50) should be processed next but, again, three items are still being processed for a.com. Consequently, item b.com (55) gets processed (step 1013). When item a.com (10) gets processed out, item a.com (30) may now be processed, although item a.com (40) and a.com (50) still cannot be processed due to concurrency (step 1015). When item a.com (15) gets processed out, item a.com (40) may be processed, although item a.com (50) still cannot be processed (step 1017). When item a.com (18) is processed out, item a.com (50) may be processed (step 1019).

When item b.com (45) is processed out, item c.com (60) moves up for processing (step 1021). When it gets processed out, item a.com (65) moves up, but it cannot be processed because there are already three items for a.com (step 1023). When item a.com (30) is processed, item b.com (70) moves up for processing (step 1025). When item a.com (40) gets processed out, item b.com (75) moves up, but it cannot be processed because two items are already being processed for b.com (step 1027). Item a.com (50) may then be processed out, but item b.com (75) still may not be processed because of the two b.com items still being processed (step 1029). Finally, when item b.com (55) is processed out, item b.com (75) may be processed (step 1031).

Figure 11:
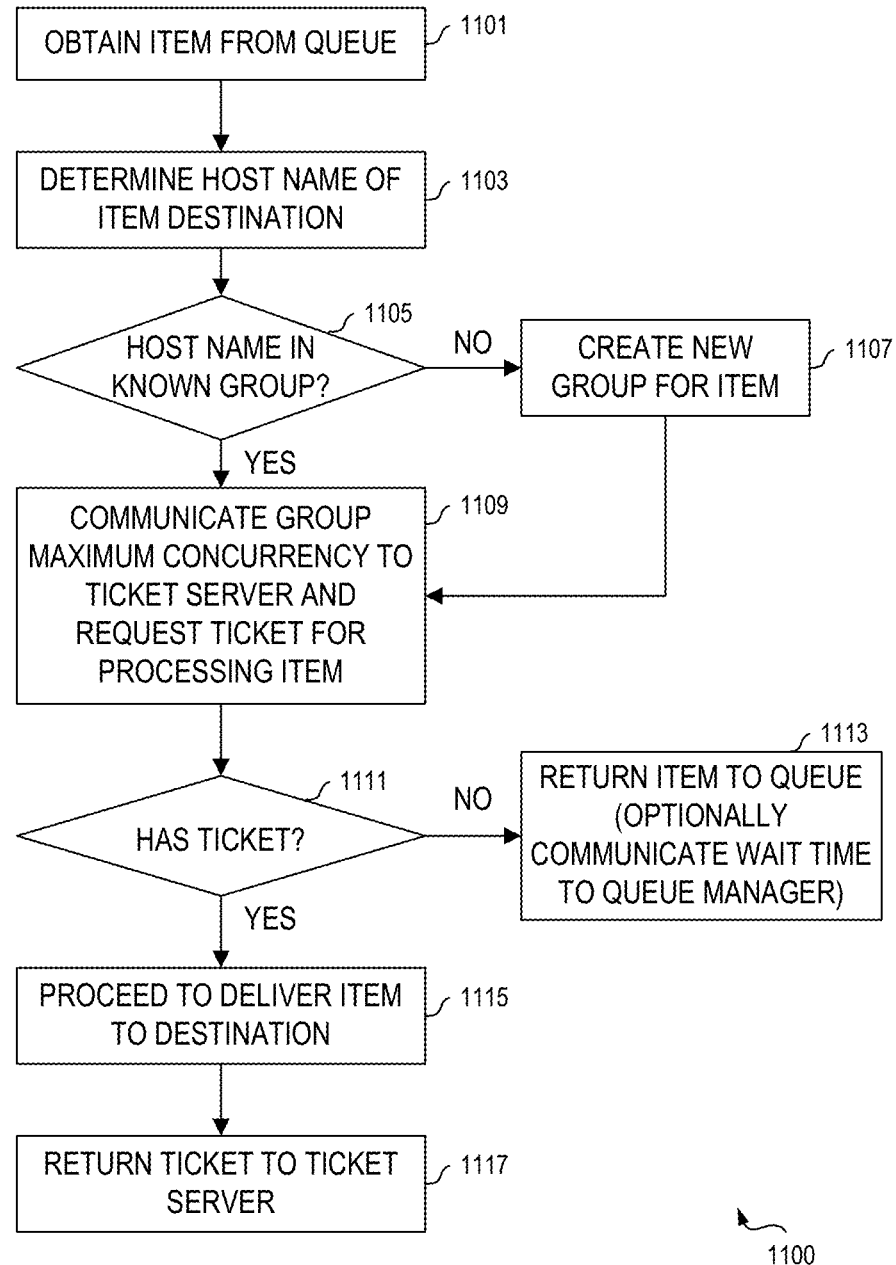
FIG. 11 depicts a flow diagram illustrating an example of a process flow for a delivery agent with concurrency enabled according to one embodiment.

FIG. 11 depicts a flow diagram illustrating an example of process flow 1100 for a delivery agent of an information delivery system with concurrency enabled in a ticket server implementation (see FIG. 3). Initially, the agent obtains or receives a queue item from a corresponding queue (step 1101). The agent determines a destination group for the item (step 1103). In particular, the agent will first determine a host name of a queue item destination (step 1105). If the host name is not known to the group, the agent will create a new group for the item (step 1107). Otherwise, the agent will communicate the item concurrency for the destination group to the ticket server (step 1109). In some embodiments, the agent will communicate the maximum concurrency for the group to the ticket server and request a ticket for processing the item (step 1111). In some embodiments, the agent may be configured with the maximum concurrency prior to receiving the item. Upon receipt of the ticket, the agent will proceed to deliver the item to the destination (step 1115) and return the ticket to the ticket server (step 1117). If no ticket was received, then the agent will return the item to the queue (step 1113).

In some embodiments, the agent may further communicate a wait time to an associated queue manager, i.e., a time that the ticket server told the agent it should wait until there likely would be a ticket available again. The wait time may be determined by computing a difference between a start of a current time slot and current time, the current time slot configured to be filled with a predetermined number of ticket requests. In some embodiments, the destination group can be one of a plurality of destination groups and the item concurrency of each group controls the delivery of at least one of the items to the respective group.

Figure 12:
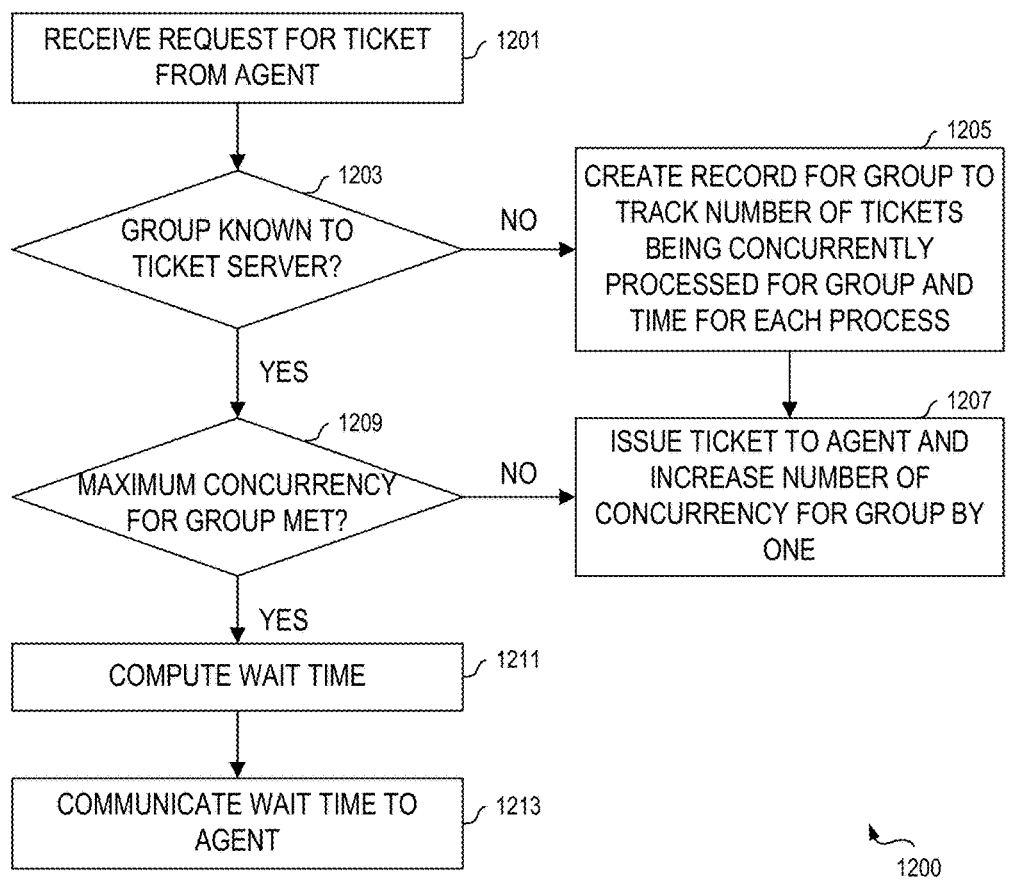
FIG. 12 depicts a flow diagram illustrating an example of a ticket server's response according to one embodiment.

FIG. 12 depicts a flow diagram illustrating an example of a ticket server's response 1200 to a ticket request. As shown, the ticket server may receive a request for a ticket for a group from an agent (step 1201). The ticket server may determine whether the group is known (step 1203). If the group is not known to the ticket server, the ticket server will create a record for the group for tracking a number of tickets being concurrently processed for the group and a time for each process (step 1205), and will further issue a ticket to the agent and increase the number of concurrency for the group by one (step 1207).

If the group is known to the ticket server, the ticket server will determine if the maximum concurrency for the group has been met (step 1209). If not, it will issue a ticket for the agent and increase the number of concurrency for the group by one (step 1207). If maximum concurrency has been met, the ticket server will compute a wait time (step 1211). In some embodiments, the wait time may be based on a historical tracking of the time taken to process each ticket for the group or an estimated average time the tickets are unavailable. It then communicates the computed wait time to the agent (step 1213). As described above, items in the same group cannot be concurrently processed if the maximum concurrency limit for the group has been met. The computed wait time provides an estimate as to when a ticket may be available for the agent or another agent in the information delivery system to process the next item in the group.

Figure 13:
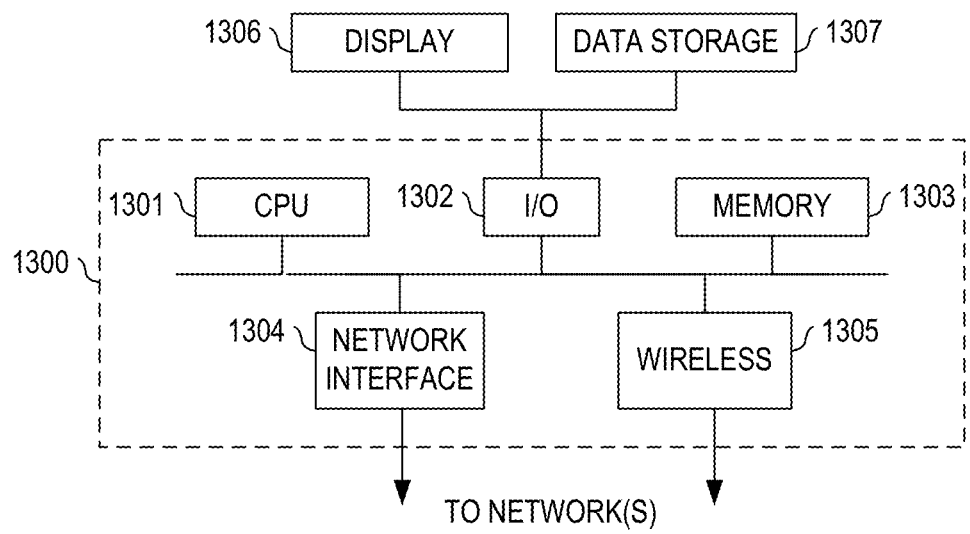
FIG. 13 depicts a diagrammatic representation of a data processing system for implementing portions and components of an information delivery system.

FIG. 13 depicts a diagrammatic representation of a data processing system for implementing portions and components of an information delivery system. As shown in FIG. 13, data processing system 1300 may include one or more central processing units (CPU) or processors 1301 coupled to one or more user input/output (I/O) devices 1302 and memory devices 1303. Examples of I/O devices 1302 may include, but are not limited to, keyboards, displays, monitors, touch screens, printers, electronic pointing devices such as mice, trackballs, styluses, touch pads, or the like. Examples of memory devices 1303 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1300 can be coupled to display 1306, information device 1307 and various peripheral devices (not shown), such as printers, plotters, speakers, etc. through I/O devices 1302. Data processing system 1300 may also be coupled to external computers or other devices through network interface 1304, wireless transceiver 1305, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips.

Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

ROMs, RAMs, and HDs are computer memories for storing computer-executable instructions executable by a CPU or capable of being compiled or interpreted to be executable by the CPU. Suitable computer-executable instructions may reside on a computer readable medium (e.g., a ROM, a RAM, and/or a HD), hardware circuitry or the like, or any combination thereof. Within this disclosure, the term "computer readable medium" is not limited to ROMs, RAMs, and HDs and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The scope of the present disclosure should be determined by the following claims and their legal equivalents.

What is claimed is:

1. A system for delivery pacing over a computer network, the system comprising:
    a server machine that includes:
        a device processor; and
        a non-transitory computer-readable storage medium that stores computer instructions translatable by the processor, for implementing:
            a queue manager that runs on the server machine and is configured to manage a queue for items from a plurality of clients wherein items are placed into the queue and processed out of the queue based at least in part on a priority order, wherein the queue manager is further configured to track active items from the queue;
            an agent that runs on the server machine and is configured to:
                dequeue an item from the queue, the item specifying a destination on the computer network, wherein the destination comprises a destination machine;
                determine whether the item dequeued by the agent from the queue contains a concurrency parameter for a group associated with the destination on the computer network, wherein the concurrency parameter specifies a maximum number of items in the group that can be concurrently processed for delivery to the destination; and
                based on a determination that the item dequeued from the queue by the agent does not contain a concurrency parameter for a group:
                    dynamically determine a concurrency parameter for the item dequeued from the queue; and
                    enqueue the item dequeued from the queue back to the queue with the dynamically determined concurrency parameter included in the item that is enqueued back to the queue;
            wherein the queue manager is further configured to control concurrency of delivery over the computer network by applying a concurrency rule to the item for pacing delivery of the item from the queue over the computer network based on the dynamically determined concurrency parameter, wherein the queue manager is configured to:
                determine the dynamically determined concurrency parameter from the item and set a concurrency limit for the group associated with the destination based on the dynamically determined concurrency parameter;
                in response to a dequeue attempt:
                    determine whether the concurrency limit for the group associated with the destination has been met based on a number of active items associated with the group;
                    return a highest priority queue item of the group associated with the destination based on a determination that the concurrency limit is not met for the group: and
                    move to a next destination group based on a determination that the concurrency limit for the group associated with the destination has been met.

2. The system of claim 1, wherein the item dequeued by the agent from the queue is a document, fax, file, message, or piece of information.

3. The system of claim 1, wherein the group is one of a plurality of destination groups associated with different destinations on the network, wherein the server machine is connected to a predetermined number of lines for servicing the different destinations on the network, and wherein the concurrency parameter of each destination group of the plurality of destination groups specifies a maximum number of items in each destination group that can be concurrently processed for delivery over the network to a respective destination on the network.

4. The system of claim 1, wherein the queue manager applies the concurrency rule to the item independently of a priority value associated with the item.

5. The system of claim 1, wherein the agent is one of a plurality of background processes at the server machine.

6. A method for delivery pacing over a computer network, comprising;
    maintaining a queue for items from a plurality of clients, wherein items are placed into the queue and processed out of the queue based at least in part on a priority order;
    tracking active items from the queue;
    dequeuing, by an agent running on a server machine, an item from the queue, the item specifying a destination on the computer network, wherein the destination comprises a destination machine;
    determining, by the agent, whether the item dequeued from the queue contains a concurrency parameter for a group associated with the destination on the computer network, wherein the concurrency parameter specifies a maximum number of items in the group that can be concurrently processed for delivery to the destination;
    based on a determination that the item dequeued by the agent from the queue does not contain a concurrency parameter for a group, the agent:
        dynamically determining a concurrency parameter for the item dequeued from the queue;
        enqueuing the item dequeued from the queue back to the queue with the dynamically determined concurrency parameter included in the item that is enqueued back to the queue; and controlling concurrency of delivery over the computer network by applying a concurrency rule to the item for pacing delivery of the item over the computer network based on the dynamically determined concurrency parameter, further comprising;
 determining the dynamically determined concurrency parameter from the item and setting a concurrency limit for the group associated with the destination based on the dynamically determined concurrency parameter;
 in response to a dequeue attempt:
  determining whether the concurrency limit for the croup associated with the destination has been met based on a number of active items associated with the group;
  returning a highest priority queue item of the group associated with the destination based on a determination that the concurrency limit is not met for the group; and
  moving to a next destination group based on a determination that the concurrency limit for the group associated with the destination has been met.

7. The method according to claim 6, wherein the item dequeued from the queue by the agent comprises a document, a fax, a file, a message, or a piece of information.

8. The method according to claim 6, wherein the group is one of a plurality of destination groups associated with different destinations on the network, wherein the server machine is connected to a predetermined number of lines for servicing the different destinations on the network, and wherein the concurrency parameter of each destination group of the plurality of destination groups specifies a maximum number of items in each destination group that can be concurrently processed for delivery over the network to a respective destination on the network.

9. The method according to claim 6, further comprising:
prior to the dequeuing by the agent, determining whether concurrency is enabled in a delivery system, wherein the agent performs the determining whether the item dequeued from the queue contains the concurrency parameter based on a determination that concurrency is enabled in the delivery system.

10. The method according to claim 6, further comprising:
performing the determining by the agent only if concurrency is enabled in a delivery system implementing the method.

11. The method according to claim 6, wherein a queue manager applies the concurrency rule to the item dequeued by the agent from the queue independently of a priority value associated with the item obtained from the queue.

12. The method according to claim 6, wherein the agent is one of a plurality of background processes running on the server machine.

13. A computer program product comprising a non-transitory computer readable medium storing instructions translatable by a processor to perform:
 maintaining a queue for items from a plurality of clients communicatively connected to the processor over a computer network, wherein the items are placed into the queue and processed out of the queue based at least in part on a priority order;
 tracking active items from the queue;
 dequeuing an item from the queue, the item specifying a destination on a computer network, wherein the destination comprises a destination machine;
 determining whether the item dequeued from the queue contains a concurrency parameter for a group associated with the destination on the computer network, wherein the concurrency parameter specifies a maximum number of items in the group that can be concurrently processed for delivery to the destination;
 based on a determination that the item dequeued from the queue does not contain a concurrency parameter for a group:
  dynamically determining a concurrency parameter for the item dequeued from the queue; and
  enqueuing the item dequeued from the queue back to the queue with the dynamically determined concurrency parameter included in the item that is enqueued back to the queue; and
 controlling concurrency of delivery over the computer network by applying a concurrency rule to the item for pacing delivery of the item over the computer network based on the dynamically determined concurrency parameter further comprising:
  determining the dynamically determined concurrency parameter from the item and setting a concurrency limit for the group associated with the destination based on the dynamically determined concurrency parameter;
  in response to a dequeue attempt:
   determine whether the concurrency limit for the group associated with the destination has been met based on a number of active items associated with the group:
   returning a highest priority queue item of the group associated with the destination based on a determination that the concurrency limit is not met for the group; and
   move to a next destination group based on a determination that the concurrency limit for the group associated with the destination has been met.

14. The computer program product of claim 13, wherein the group is one of a plurality of destination groups associated with different destinations on the network, wherein the server machine is connected to a predetermined number of lines for servicing the different destinations on the network, and wherein the concurrency parameter of each destination group of the plurality of destination groups specifies a maximum number of items in each destination group that can be concurrently processed for delivery over the network to a respective destination on the network.

15. The computer program product of claim 13, wherein the non-transitory computer readable medium further stores instructions translatable by the processor to perform:
 determining whether concurrency is enabled in a delivery system implementing the computer program product; and
 if the concurrency is not enabled in the delivery system implementing the computer program product, delivering the item dequeued by the agent from the queue to the destination on the network without processing the concurrency parameter.

16. The computer program product of claim 13, wherein the concurrency rule is applied to the item dequeued by the agent from the queue independently of a priority value associated with the item dequeued from the queue.

* * * * *